United States Patent [19]

Antelman

[11] Patent Number: 5,017,295

[45] Date of Patent: May 21, 1991

[54] DIVALENT SILVER BACTERICIDE FOR WATER TREATMENT

[75] Inventor: Marvin S. Antelman, Rehovot, Israel

[73] Assignee: N. Jonas & Co., Inc., Bensalem, Pa.

[21] Appl. No.: 517,169

[22] Filed: May 1, 1990

[51] Int. Cl.$^5$ .............................................. C02F 1/50
[52] U.S. Cl. ..................................... 210/764; 422/19; 422/28; 424/618; 514/495
[58] Field of Search ................... 210/764, 169; 422/28, 422/19; 424/618; 514/495

[56] References Cited

U.S. PATENT DOCUMENTS 4,055,655 10/1977 Maurer et al. ........................ 514/495
4,092,245 5/1978 Franks et al. ........................ 424/618

*Primary Examiner*—Stanley Silverman
*Assistant Examiner*—Neil M. McCarthy
*Attorney, Agent, or Firm*—Salter & Michaelson

[57] ABSTRACT

A method or methods of controlling the growth of bacteria in the water of swimming pools and/or industrial water supplies by adding to the water a specified concentration of a stable divalent silver compound. The invention has the advantage over chlorination in that it is odorless and non-volatile. It furthermore is superior to monovalent silver compounds as these compounds do not decompose in the presence of light and resist precipitation by halides and form divalent soluble complexes which in the monovalent state are invariably insoluble solids.

5 Claims, No Drawings

DIVALENT SILVER BACTERICIDE FOR WATER TREATMENT

BACKGROUND OF THE INVENTION

Industrial cooling water is prone to bacterial contamination as it may stand for long periods of time and breed bacteria. On the other hand, swimming pool water is constantly recirculated and fresh water is added to maintain a constant volume, and is filtered to remove particulate matter. Nevertheless, said water is constantly exposed to infection by microbes.

The primary disinfectant for swimming pool water is chlorine which causes eye irritation and breathing difficulties in certain sensitive individuals. Chlorine and its reaction products with water are volatile and dissipate. Chlorine also is prone to form carcinogenic chloramines in underchlorinated pools and will also form haloforms which are harmful to the ecosystem. While all the aforementioned problems relating to people utilizing swimming pools do not apply to industrial cooling water, increased public awareness has precluded the use of such bactericides as mercury-based compounds, which harm the biosphere. To such water and all the other problems pertaining to chlorine is the instant invention directed.

The metal silver in its monovalent state has been suggested as a bactericide for these applications. It, unlike chlorine, does not dissipate and is more compatible with the environment and does not cause the adverse reactions in humans known to chlorine. However, large concentrations of this precious metal are required. It also has a tendency to precipitate, stain and decompose in the presence of light.

OBJECTS OF THE INVENTION

An important object of this invention is to provide a silver-based bactericidic agent for industrial cooling and swimming pool water that is more stable than monovalent silver.

Still another object of this invention is to provide for silver in a more potent form as a bactericide so that it will kill at lower levels of silver then has heretofore been known to those skilled in the art of utilizing such substances.

Other objects, features and advantages of the invention shall become apparent as the description thereof proceeds when considered in connection with the accompanying specific examples.

SUMMARY OF THE INVENTION

This invention relates to methods for keeping the water in swimming pools and in industrial cooling installations free from bacteria. Said methods relate to bactericidic agents based on divalent silver compounds which are used as disinfectants. More particularly, this invention concerns those divalent silver compounds which form stable complexes.

Divalent silver complexes are prepared by reacting silver(II) oxide with various acids that form stable silver complexes. Said complexes are then evaluated as to their efficacy in killing streptococcus faecalis which is the accepted protocol for swimming pool and cooling water disinfectants.

When the stable silver (II) complexes were evaluated in this manner, it was found that there were 100% kills of bacteria within 5 minutes at concentrations of silver as low as 2 parts per million.

It was also found that at these effective concentrations and higher, there was no chloride precipitation from water containing 0.1 gram of sodium chloride per liter which would precipitate soluble silver at the same concentrations in the monovalent state.

When stable Ag(II) compounds were exposed to light for long periods of time, there was either very slight evidence of decomposition or none at all in contradistinction to those monovalent solutions which decomposed.

Stable divalent silver compounds which were effective have been defined in the literature. For example, G. A. Rechnitz and S. B. Zamochnick have studied the behavior of Ag(II) in phosphoric acid (*Talanta*, 1965, Vol. 12, 479-83) and found the complexes to be stable.

I have found that Ag(II) phosphates and fluoborates are particularly excellent disinfectants and are extremely stable, whereas Ag(II) ammonium sulfate and methanesulfonate are unstable and not good disinfectants.

DESCRIPTION OF THE PREFERRED EMBODIMENTS

As illustrative of the compositions of this invention in their preferred embodiments is the following:

EXAMPLE 1

Silver (II) oxide was prepared by modifying the procedure described by Hammer and Kleinberg in *Inoroanic Syntheses* (IV, 12). A stock solution was prepared by dissolving 24.0 grams of sodium hydroxide in 500 ml. of distilled water which had previously been made to said volume after dissolving 24.0 grams of potassium peroxydisulfate. Into 20 ml. vials were weighed silver nitrate containing 1.0 gram of silver. Now 50 ml. of the aforementioned stock solution were heated in a 100 ml. beaker, and the contents of one of the vials was added to the solution after it had reached the temperature of 85° C. The beaker was then heated to 90° C. for 15 minutes. The subsequent silver (II) oxide which formed as a deep black precipitate was washed and decanted 4 times with distilled water. It was then dissolved in 25 ml. of 85% reagent grade phosphoric acid and unlike the monovalent phosphate was soluble in water. 100 ml. of this solution was added to a liter of distilled water to give a final concentration of silver that was 4.0 parts per million. This in turn was submitted to a bactericidic pre-screening following "good laboratory practice regulations" as set forth in Federal regulations (FIFRA and ffdca/40 CFR 160, May 2, 1984). The protocol consisted of exposures to streptococcus faecalis using AOAC (15th) 1990:965:13 at two exposure times, 5 and 10 minutes. The results were 100% kills of bacteria. The tests were repeated using the same solution at one-half the silver concentration. The results were the same at 2.0 parts per million silver.

Both silver (II) phosphate solutions at 2.0 and 4.0 parts per million, respectively, were subjected to mixing with 0.100 grams of sodium chloride dissolved in a liter of water. There was no precipitation of chloride at all.

Both silver (II) solutions were exposed for 45 days to the Mediterranean sun in the State of Israel at Rehovot, for a period of 45 days during the months of January and February. There was only a slight darkening at the bottom of the vial of 4.0 ppm solution, and absolutely none in the 2.0 ppm solution. Silver nitrate solutions at the same concentrations of silver darkened in less than 48 hours, under the same conditions.

EXAMPLE 2

Silver (II) oxide was prepared in the manner described in Example 1. Silver oxide (AgO) containing 1 gram of silver was dissolved in 10 cc of 48% fluoboric acid. The resulting colorless solution was tested according to the aforementioned protocol involving streptococcus faecalis where the silver (II) concentration of the fluoborate was 5.0 ppm. 100% kills resulted after 5 and 10 minutes. This was then compared with a preparation of monovalent silver fluoborate obtained from the reaction of silver (I) oxide with fluoboric acid. The Ag(I) fluoborate at a concentration of 62.5 ppm did not prevent the bacteria from reproducing. Exposure of the resulting Ag(II) solution to sunlight according to the procedure described in Example 1 did not yield any evidence of decomposition whatsoever.

The divalent silver phosphate solution of Example 1 and the divalent silver fluoborate solution of Example 2 represent classes of compounds known in the art as inorganic ligands, i.e., the silver atoms are attached to inorganic ligands.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by these claims.

What is claimed is:

1. A method for controlling the growth of bacteria in the water of swimming pools and industrial cooling water which comprises adding to the water a stable divalent silver complex compounds, said silver complex compound comprising divalent silver attached to an inorganic ligand.

2. A method as claimed in claim 1 wherein the divalent silver complex compound is used in a amount to provide a silver concentration from 0.5 to 15 parts per million.

3. The method of claim 1 wherein said inorganic ligand is fluoborate.

4. The method of claim 1 wherein said inorganic ligand is phosphate.

5. The method of claim 1 wherein the divalent silver complex compound is light stable so as not to discolor or leave black silver films on the inner surface of vessels containing the water to be treated.

* * * * *